United States Patent [19]
Blair et al.

[11] Patent Number: 6,031,630
[45] Date of Patent: Feb. 29, 2000

[54] METHOD AND APPARATUS FOR UNDERCOLOR REMOVAL DURING PAGE PIPELINE PROCESSING

[75] Inventors: Timothy P. Blair, Boise; Jeff H. Papke, Meridian; Roger T. Baird, Boise, all of Id.

[73] Assignee: Hewlett-Packard Company, Palo Alto, Calif.

[21] Appl. No.: 09/073,013

[22] Filed: May 5, 1998

[51] Int. Cl.$^7$ .............................. G06F 15/00; G03F 3/08
[52] U.S. Cl. ........................ 358/1.9; 358/529; 382/163
[58] Field of Search .................................. 395/109, 101, 395/116, 117, 114, 111; 358/529, 501, 502, 503, 504, 518, 523, 534; 382/163, 167, 162

[56] References Cited

U.S. PATENT DOCUMENTS

| | | | |
|---|---|---|---|
| 4,831,409 | 5/1989 | Tatara et al. | 382/167 |
| 5,181,068 | 1/1993 | Morikawa | 355/77 |
| 5,255,084 | 10/1993 | Morikawa et al. | 358/527 |
| 5,315,381 | 5/1994 | Yamashita et al. | 358/500 |
| 5,359,437 | 10/1994 | Hibi | 358/529 |
| 5,838,885 | 11/1998 | Shu et al. | 358/1.9 |
| 5,920,645 | 7/1999 | Aida | 382/167 |
| 5,923,821 | 7/1999 | Birnbaum et al. | 358/1.9 |

*Primary Examiner*—Madeleine Nguyen

[57] ABSTRACT

A method for undercolor removal (UCR) from a multi-color image represented by N color planes of non-black pixel image color values and replacement of removed undercolor by black values, includes the following steps. A corrected black color plane is obtained by replacing initial maximum black color values with black color values that are a Min function between the initial black color values and N-1 logically corresponding non-black pixel image color values. Page strip portions of the corrected black color plane are then revised so that each pixel black color value thereof is converted to a UCR value by deriving the Min function with logically corresponding, Nth color plane non-black pixel image color values. Next, logically corresponding UCR values for each page strip are subtracted from Nth color plane non-black pixel image color values and each page strip from the Nth color plane is passed to a print engine for rendering. Next, logically corresponding UCR values for each page strip are subtracted from the remaining ones of the N-1 color plane non-black pixel image color values. The N-1 color plane page strips are then fed to the print engine. The UCR values from the black color plane are then used for GCR.

10 Claims, 3 Drawing Sheets

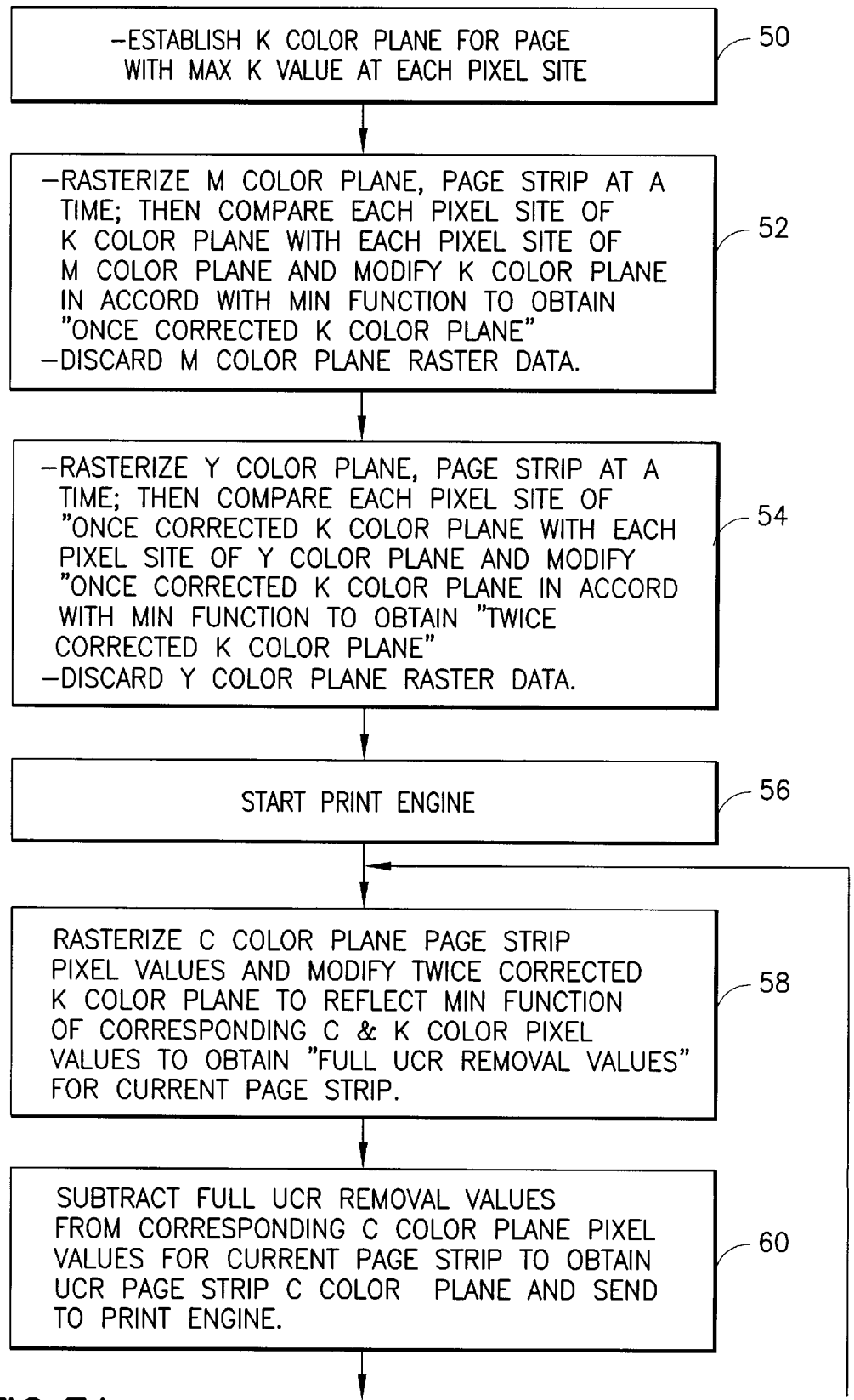

METHOD AND APPARATUS FOR UNDERCOLOR REMOVAL DURING PAGE PIPELINE PROCESSING

FIELD OF THE INVENTION

This invention relates to a method and apparatus for undercolor removal during a page rasterization action and, more particularly, to a method and apparatus for undercolor removal which enables improved memory utilization in a printer.

BACKGROUND OF THE INVENTION

Current laser printers employ cyan (C), magenta (M), yellow (Y) and black (K) toners to produce full color images. Theoretically, a mixture of CMY, in equal amounts should produce black, just as an additive combination of red, green and blue colors should produce white. However, actual printing with CMY toners generally does not produce a true black, but instead provides a muddy, grayish-brown. This is due to impurities in the toners, reflection of light from the surface of the toner (so that it does not pass through the toner layers to be absorbed) and difficulty in obtaining complete coverage of white paper.

The most common solution is to add a separate black toner to the printing process. This reduces the need for large amounts of the color toners, reduces the thickness of ink build-up on the page and reduces cost. But, from the standpoint of image quality, the most important factor is that it allows dark colors to be printed, without appearing muddy.

The CMYK system employs four half-tone screens, one for each toner. However, while converting from red, green, blue colors to CMY (often called process color) is straightforward, converting to CMYK is not. Rules to calculate how much black to put into various color representations depend far more on visual response to colors, the kind of paper to be printed, the illumination with which the print will be viewed and even the contents of the images.

Algorithms for converting CMY to CMYK involve specifying levels of undercolor removal (UCR) and grey component replacement (GCR). One approach is to use the value of whichever of the three components (CMY) is least intense to determine an amount of black to be added. For instance, for a color containing 80% cyan, 50% magenta and 30% yellow, the 30% value is taken as an index into a built-in calibration curve. This might indicate that a 15% value for the black toner should chosen for GCR. Then, the amount of the principal color (in this example, C) or the amounts of all of the colors are reduced. In the latter case, the 30% value is known as the "Min" function which essentially defines the minimum value of all of the constituent colors at the specific location in the image.

The UCR and GCR processes can consume considerable memory during the processing of an image. UCR procedures require copies of C, M, Y and K color planes to be retained while the UCR processing is in progress. As reduction of memory utilization in a printer directly equates to lowered printer costs, continuing efforts are being made to improve memory utilization during high usage operations, such as during image rasterization and UCR actions.

Accordingly, it is an object of this invention to provide an improved method and apparatus for enabling UCR in a full color printer.

It is an another object of this invention to provide an method and apparatus for UCR wherein memory utilization is improved.

SUMMARY OF THE INVENTION

A method for undercolor removal (UCR) from a multicolor image represented by N color planes of non-black pixel image color values and replacement of removed undercolor by black values, includes the following steps. A corrected black color plane is obtained by replacing initial maximum black color values with black color values that are a Min function between the initial black color values and N−1 logically corresponding non-black pixel image color values. Page strip portions of the corrected black color plane are then revised so that each pixel black color value thereof is converted to a UCR value by deriving the Min function with logically corresponding, Nth color plane non-black pixel image color values. Next, logically corresponding UCR values for each page strip are subtracted from Nth color plane non-black pixel image color values and each page strip from the Nth color plane is passed to a print engine for rendering. Next, logically corresponding UCR values for each page strip are subtracted from the remaining ones of the N−1 color plane non-black pixel image color values. The N−1 color plane page strips are then fed to the print engine. The UCR values from the black color plane are then used for GCR.

BRIEF DESCRIPTION OF THE DRAWINGS

FIGS. 3A, 3B illustrate a logical flow diagram of the method of the invention.

DETAILED DESCRIPTION OF THE INVENTION

Figure 1:
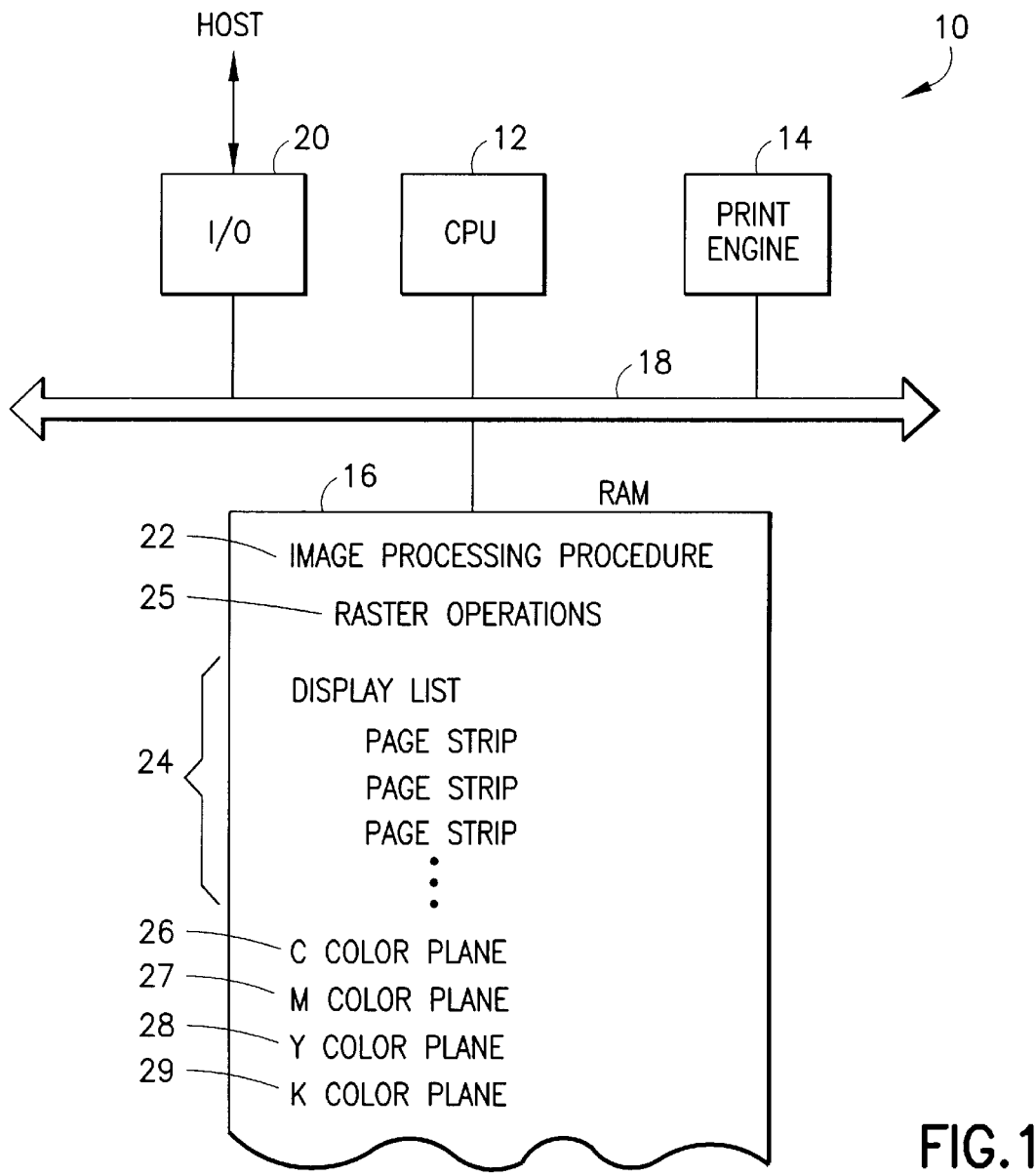
FIG. 1 is a high level block diagram of a printer which incorporates the invention hereof.

Referring to FIG. 1, a printer 10 comprises a central processing unit (CPU) 12, a print engine 14 and a random access memory (RAM) 16, all of which are interconnected over a bus system 18. An input/output module 20 receives page description data from a host processor and temporarily stores that data in RAM 16. Image processing procedure 22, in conjunction with CPU 12, control the conversion of received page description data into raster data that is suitable for rendering onto a media sheet by print engine 14.

The data received from the host processor is in the form of a page description language such as PCL or PostScript. Image processing procedure 22 converts the input page description language into a display list 24 which, in essence, comprises a plurality of page strips which, together, define the images to be placed on a media sheet. Each page strip comprises a segment of the page being printed and includes instruction information relating to the objects positioned within the page strip.

Once a plurality of page strips have been created by image processing procedure 22, a raster operation 25 commences conversion of each page strip into a raster format. Raster operation 25 creates a C color plane 26, M color plane 27, Y color plane 28 and K color plane 29 for the image. In a laser printer which operates in a "non-race" mode, all page strips are first rasterized to create individual C, M, Y and K color planes. The color planes are then sequentially fed to print engine 14 for rendering onto a media sheet.

In a laser printer which operates in a "race mode", rasterized color data is fed to print engine 14 as the rasterized image data is created, care being taken to assure that there is sufficient data awaiting printing to continually provide print engine 14 with data to be printed. In such a system display list 24, for each strip, is "run" to convert each page strip into raster image data which is then transmitted to print engine 14 for rendering onto a media sheet. Before such transfer is accomplished, both UCR and GCR actions must be performed.

Figure 2:
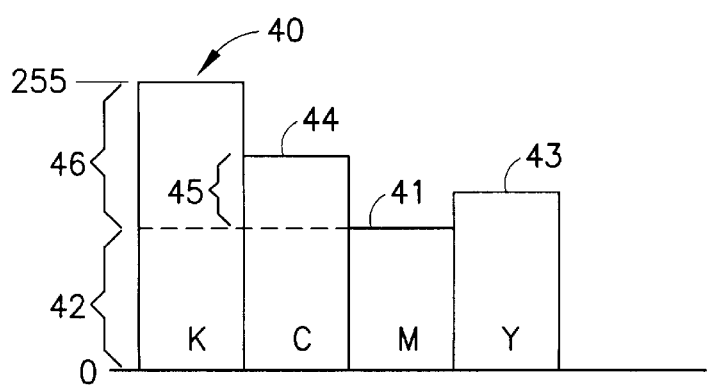
FIG. 2 is a schematic illustration indicating undercolor removal.
Figure 3B:
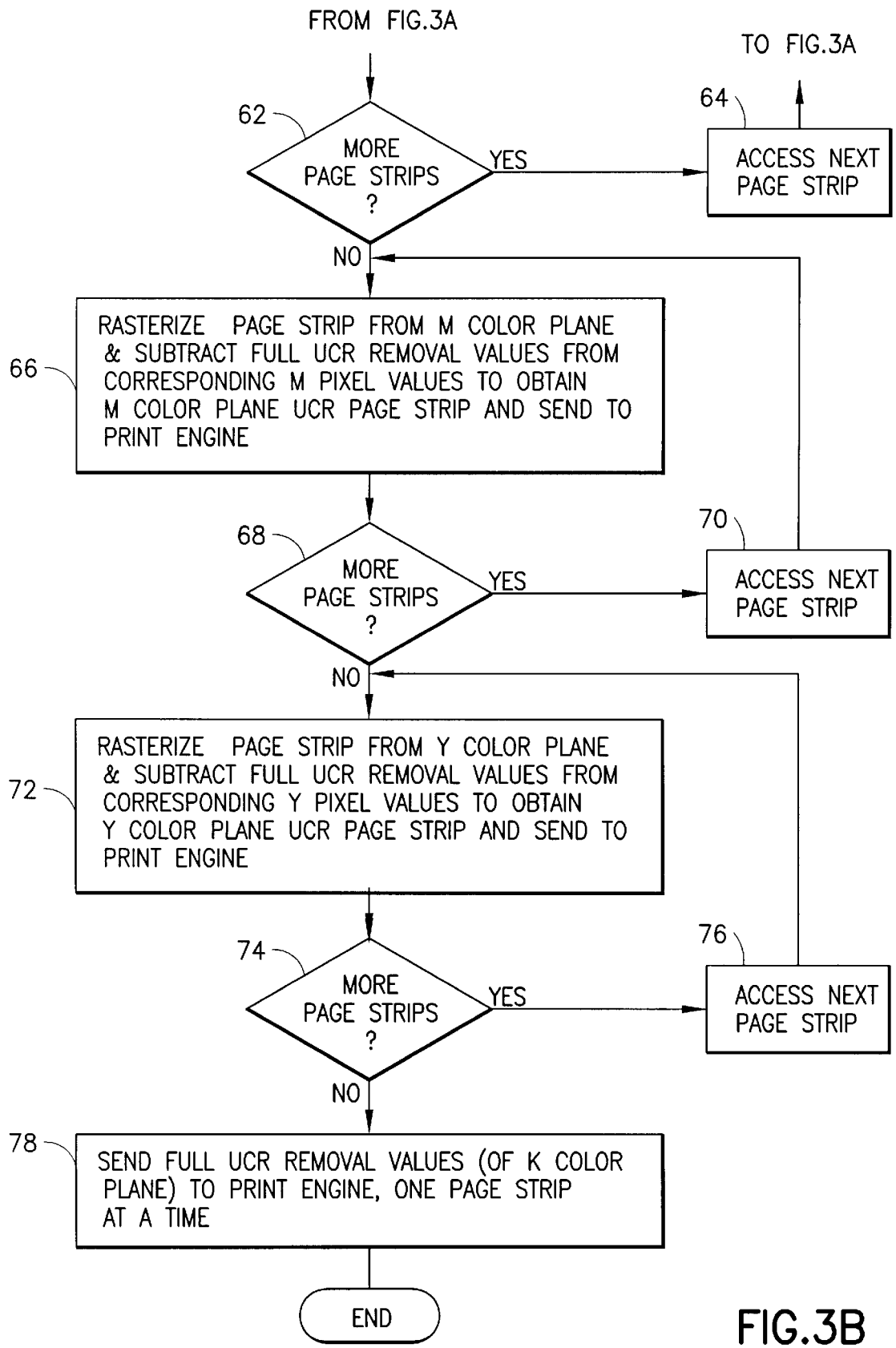

Referring to FIGS. 3A and 3B, the UCR procedure employed by printer 10 will be described, in conjunction with the schematic color showing of FIG. 2. The UCR action commences by establishing a K color plane 29 with a maximum K value at each pixel site (step 50). With reference to FIG. 2, each K pixel site, assuming an 8-bit color value, is set at a 255 value, as shown by K color bar 40. Next, the M color plane is rasterized, each pixel site of K color plane 29 is compared with each pixel site of M color plane 27, and the K color plane 29 color values are modified to reflect a Min of corresponding M and K pixel values to obtain a "once corrected K color plane" (step 52). Note that this action is performed for each page strip so that a once corrected K color plane for the full page is derived. After each page strip's M color plane raster data is used to correct the corresponding K color plane raster data, the M color plane data is discarded.

The aforesaid action can be understood by referring to FIG. 2, wherein M color value 41 is compared to K color value 40 for each pixel site. The Min value, as between the K and M values, is designated by 42. Accordingly, K color value 40 is reduced to M color value 42, i.e., the Min value.

Returning to FIG. 3A, the procedure is repeated for each pixel site in Y color plane 28. More specifically, the Y color plane is rasterized, each pixel site of the "once-corrected K color plane" is compared with each Y pixel site of Y color plane 28, and the once corrected K color plane is modified, if necessary, to reflect the Min value of the corresponding Y and K pixel values (step 54). In the example shown in FIG. 2, if the Y color value 43 is less than M color value 41, the difference therebetween is subtracted from the once corrected K color value 42. Otherwise, the K color value 42 remains unchanged.

After this action has been performed on all Y color plane pixel sites, a full page "twice-corrected K color plane" results (i.e., using the M and Y color plane pixel values). At this stage, ⅔ of the information required for a GCR K color plane has been produced. Note that this action is performed for each page strip so that a twice corrected K color plane for the full page is derived. After each page strip's raster data is used to correct the corresponding K color plane pixel sites, the Y color plane data is discarded. At this stage, print engine 14 is started (step 56). Since the start of the print engine places the printer in a "race mode", the printer control procedure, upon finding a complex page strip may pre-rasterize the page strip to assure a constant supply of print data to the print engine. In such case, the rasterization process mentioned immediately below is replaced by a mere access of the rasterized page strip's color plane data.

Next, a page strip's C color plane 26 is rasterized and is used to modify the twice corrected K color plane values to reflect the Min function of positionally corresponding C color values (step 58). That is, if the C color value is less than both the corresponding M and Y color values, the difference therebetween is subtracted from the twice corrected corresponding K color value. This enables the K color plane, for at least the current page strip, to reflect full UCR removal values for the current page strip.

Thereafter, the full UCR removal values for the current page strip are subtracted from the corresponding C color plane pixel values to obtain a UCR corrected C color plane for the respective page strip. At this stage, the corrected page strip's C color plane is sent to print engine 14 for rendering (step 60).

With reference to FIG. 2, the above described action causes each C color value 44 to be reduced by an amount 42 of the K color pixel value 40, causing the respective C color value to reflect the level illustrated by bracket 45. This action occurs with respect to each pixel site in the current page strip completes the UCR action for the current page strip.

Returning to FIG. 3B, decision step 62 determines whether further page strips remain to be processed to revise their respective C color plane values in accordance with the respective UCR values. If yes, a next page strip is rasterized (step 64) and the procedure recycles to step 58 and proceeds as shown. By contrast, if no further page strips remain for UCR action (step 62), the procedure moves to step 66 wherein UCR actions are carried out with respect to M color plane 27 for each page strip. More specifically, a page strip's M color plane 27 is rasterized and the corresponding full UCR removal values are subtracted from positionally corresponding values of M color plane 27 to obtain a UCR corrected page strip M color plane 27. That UCR corrected page strip M color plane 27 is then sent to print engine 14 for rendering.

As shown by decision step 68 and step 70, the procedure recycles until all M color planes 27 have been subjected to a UCR action. Note that because both M color plane 27 and Y color plane 28 were utilized to create the "twice corrected K color plane" in step 54, the Min calculation shown in step 58 is not required therefor.

Once all of the page strips within M color plane 27 have been subjected to a UCR action, a page strip of Y color plane 28 is rasterized and is subjected to the UCR process by subtracting the full UCR removal values from positionally corresponding Y color plane 28 pixel values. The resultant UCR corrected page strip Y color plane 28 is then sent to the print engine (step 72). Thereafter, the procedure proceeds through steps 74 and 76 until all Y color plane 28 page strips have been subjected to the UCR action.

Thereafter, the full UCR removal K values (i.e., K color plane 29) are utilized as the GCR and are sent directly to the print engine, one page strip at a time (step 78). Accordingly, no further calculations are required to accomplish the derivation of the GCR values.

As an example, assume that there are three page strips per color plane and that the print engine requires supply of the page strips in the following order: C, M, Y and K. The invention now initializes a full page K color plane with maximum K color values (e.g. 255). Next, each page strip for the M color plane is rasterized and the K color plane is updated accordingly, i.e., $K_{new}=\text{Min}(M, K_{old})$. Each page strip for the Y color plane is then rasterized and the K color plane is updated, i.e., $K_{new}=\text{Min}(Y, K_{old})$. The page strip's M and Y raster data are then discarded. At this point there exists a full raster, "twice corrected" K color plane and a display list to be rasterized to form the C, M and Y color planes. By contrast to the case where all CMY and K color planes are pre-rasterized and retained (i.e., four color planes), the invention conserves memory by discarding unneeded pre-rasterized color planes and replacing them with a display list which occupies less memory space.

The page processing pipeline and print engine are then started and each page strip for the C color plane is rasterized and the K color plane is updated to reflect the Min values of the respective pixel sites when comparing the C and K values. Each strip of the C plane is then updated in accordance with the equation $C_{new}=C_{old}-K$ and is sent to the print engine.

Each page strip for the M color plane is then race rasterized and updated, $M_{new}=M_{old}-K$. The updated M color plane is sent to the print engine. Each strip of the Y plane is then rasterized and updated ($Y_{new}=Y_{old}-K$) and is sent to the print engine. Thereafter, the K color plane is utilized as the GCR plane and is sent to the print engine.

While the above description has assumed the use of a simple Min function when Min calculations and derivation of undercolor removal values are performed, it is to be understood that a simple Min function is merely exemplary. As described above, either the Min value or a function of the C, M and Y color values can be utilized to access a table of non-linear values to achieve a non-linear UCR action in accordance with current print/media conditions. Accordingly, the UCR function is contemplated to include any such linear/non-linear UCR action.

It should be understood that the foregoing description is only illustrative of the invention. Various alternatives and modifications can be devised by those skilled in the art without departing from the invention. For example, while the K color plane is described as being initialized to a maximum black value, it can be initialized to any value, so long as the subsequent calculations are adjusted accordingly. Further, the color planes can be sent to the print engine in any desired order. Also, while image processing procedure is illustrated as already loaded into RAM 16, it may also be configured in the form of a memory media, such as a magnetic disk, which is loaded into RAM 16 as needed. Accordingly, the present invention is intended to embrace all such alternatives, modifications and variances which fall within the scope of the appended claims.

We claim:

1. A method for undercolor removal (UCR) from a multi-color image represented by N color planes of non-black pixel image color values and replacement of removed undercolor by black values, said method comprising the steps of:
   a) obtaining a corrected black color plane of initial maximum black color values by replacing each black color value with a black color value that is a function of an initial maximum black color value and N–1 of logically corresponding non-black pixel image color values;
   b) revising page strip portions of said corrected black color plane so that each pixel black color value thereof is converted to a UCR value by deriving said function of said each pixel black color value and a logically corresponding, Nth color plane non-black pixel image color value;
   c) subtracting from respective ones of Nth color plane non-black pixel image color values, logically corresponding UCR values for each page strip and feeding each said page strip to a print engine for rendering of resultant Nth color plane non-black pixel image color values;
   d) subtracting from remaining ones of said N–1 color plane non-black pixel image color values, logically corresponding UCR values for each page strip and feeding each said page strip to the print engine for rendering of each resultant color plane of resultant non-black pixel image color values; and
   e) employing said UCR values from said black color plane as derived in step b) to enable rendering of black by said print engine.

2. The method of claim 1 wherein said function is the Min of compared color values.

3. The method of claim 1 wherein step c), after said subtracting action is applied to each page strip, said each page strip is passed to the print engine for rendering of resultant Nth color plane non-black pixel image color values.

4. The method of claim 1 wherein step d), after said subtracting action is applied to each page strip, said page strip is passed to the print engine for rendering of each resultant non-black pixel image color values.

5. The method of claim 1 wherein step a), after obtaining said corrected black color plane, releases for other use, memory allocated for storage of said N–1 of logically corresponding non-black pixel image color values.

6. A memory media for controlling a processor to perform undercolor removal (UCR) from a multi-color image represented by N color planes of non-black pixel image color values and to replace removed undercolor by black values, said memory media comprising:
   a) means for controlling said processor to obtain a corrected black color plane of initial maximum black color values by replacing each initial maximum black color value with a black color value that is a function of an initial maximum black color value and N–1 of logically corresponding non-black pixel image color values;
   b) means for controlling said processor to revise page strip portions of said corrected black color plane so that each pixel black color value thereof is converted to a UCR value by deriving said function of said each pixel black color value and a logically corresponding, Nth color plane non-black pixel image color value;
   c) means for controlling said processor to subtract from respective ones of Nth color plane non-black pixel image color values, logically corresponding UCR values for each page strip and feeding each said page strip to a print engine for rendering of resultant Nth color plane non-black pixel image color values;
   d) means for controlling said processor to subtract from remaining ones of said N–1 color plane non-black pixel image color values, logically corresponding UCR values for each page strip and feeding each said page strip to the print engine for rendering of each resultant color plane of resultant non-black pixel image color values; and
   e) means for controlling said processor to employ said UCR values from said black color plane as derived in means b) to enable rendering of black by said print engine.

7. The memory media of claim 6 wherein said function is the Min of compared color values.

8. The memory media of claim 6 wherein means c), after said subtracting action is applied to each page strip, passes said each page strip to said print engine for rendering of resultant Nth color plane non-black pixel image color values.

9. The memory media of claim 6 wherein means d), after said subtracting action is applied to each page strip, passes said page strip to said print engine for rendering of each resultant non-black pixel image color values.

10. The memory media of claim 6 wherein means a), after obtaining said corrected black color plane, causes said processor to release for other use, memory allocated for storage of said N–1 of logically corresponding non-black pixel image color values.

* * * * *